United States Patent
Lesso et al.

(10) Patent No.: US 7,622,984 B2
(45) Date of Patent: *Nov. 24, 2009

(54) CHARGE PUMP CIRCUIT AND METHODS OF OPERATION THEREOF

(75) Inventors: John P. Lesso, Edinburgh (GB); John L. Pennock, Midlothian (GB); Peter J. Frith, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 14 days.

This patent is subject to a terminal disclaimer.

(21) Appl. No.: 12/000,547

(22) Filed: Dec. 13, 2007

(65) Prior Publication Data

US 2008/0150621 A1 Jun. 26, 2008

(30) Foreign Application Priority Data

Dec. 22, 2006 (GB) ................................ 0625957.6

(51) Int. Cl.
G05F 1/10 (2006.01)
G05F 3/02 (2006.01)
(52) U.S. Cl. ...................... 327/536; 327/535; 327/537; 363/59; 363/60
(58) Field of Classification Search ......... 327/535–537; 363/59–60
See application file for complete search history.

(56) References Cited

U.S. PATENT DOCUMENTS

| | | | |
|---|---|---|---|
| 3,772,606 A | 11/1973 | Waehner | |
| 4,054,843 A | 10/1977 | Hamada et al. | |
| 4,115,739 A | 9/1978 | Sano et al. | |
| 4,409,559 A | 10/1983 | Amada et al. | |
| 4,430,625 A | 2/1984 | Yokoyama et al. | |
| 5,075,643 A | 12/1991 | Einbinder | |
| 5,289,137 A | 2/1994 | Nodar et al. | |
| 5,442,317 A | 8/1995 | Stengel | |
| 5,532,916 A | 7/1996 | Tamagawa | |
| 5,623,222 A | 4/1997 | Tamagawa | |
| 5,760,637 A | 6/1998 | Wong et al. | |
| 5,898,340 A | 4/1999 | Chatterjee et al. | |
| 6,084,789 A * | 7/2000 | Van Lieshout | 363/60 |
| 6,166,605 A | 12/2000 | Carver | |

(Continued)

FOREIGN PATENT DOCUMENTS

EP 0 585 925 3/1994

(Continued)

OTHER PUBLICATIONS

"Dual Power JFET-Input Operational Amplifier With Switched-Capacitor Voltage Converter", TLE2662, Texas Instruments, pp. 1, 2, 10, 25 (1994).

(Continued)

*Primary Examiner*—Lincoln Donovan
*Assistant Examiner*—Adam D Houston
(74) *Attorney, Agent, or Firm*—Dickstein Shapiro LLP

(57) ABSTRACT

A charge pump circuit and associated method and apparatuses for providing a plurality of output voltages using a single flying capacitor. The circuit includes a network of switches that are operable in a number of different states and a controller for operating the switches in a sequence of states so as to generate positive and negative output voltages together spanning a voltage approximately equal to the input voltage and centered on the voltage at the common terminal.

27 Claims, 8 Drawing Sheets

U.S. PATENT DOCUMENTS

| | | |
|---|---|---|
| 6,329,800 B1 | 12/2001 | May |
| 6,370,046 B1 * | 4/2002 | Nebrigic et al. ............... 363/60 |
| 6,373,340 B1 | 4/2002 | Shashoua |
| 6,377,252 B2 * | 4/2002 | Ikeda ......................... 345/211 |
| 6,586,992 B1 | 7/2003 | Strakovsky |
| 6,643,151 B1 * | 11/2003 | Nebrigic et al. ............... 363/59 |
| 6,788,039 B2 * | 9/2004 | Abdoulin .................... 323/288 |
| 6,825,726 B2 | 11/2004 | French et al. |
| 6,828,845 B2 | 12/2004 | Pennock et al. |
| 6,859,091 B1 * | 2/2005 | Nicholson et al. ........... 327/536 |
| 6,985,024 B2 * | 1/2006 | Geen ......................... 327/536 |
| 7,030,699 B2 | 4/2006 | Richard et al. |
| 7,183,857 B2 | 2/2007 | Doy et al. |
| 7,236,046 B2 * | 6/2007 | Georgescu et al. .......... 327/536 |
| 7,541,859 B2 * | 6/2009 | Akashi et al. ............... 327/536 |
| 7,550,943 B2 * | 6/2009 | Spartano et al. ............. 320/107 |
| 2002/0153940 A1 | 10/2002 | Wurcer et al. |
| 2003/0174524 A1 * | 9/2003 | Botker et al. ................... 363/60 |
| 2004/0246050 A1 | 12/2004 | Kikuchi |
| 2005/0024962 A1 | 2/2005 | Chan et al. |
| 2005/0285682 A1 | 12/2005 | Lee et al. |
| 2006/0028849 A1 | 2/2006 | Ogata et al. |
| 2008/0044041 A1 * | 2/2008 | Tucker et al. ............... 381/120 |
| 2008/0116979 A1 | 5/2008 | Lesso et al. |
| 2008/0144861 A1 * | 6/2008 | Melanson et al. ........... 381/120 |
| 2008/0150619 A1 * | 6/2008 | Lesso et al. ................. 327/536 |
| 2008/0150620 A1 * | 6/2008 | Lesso ........................ 327/536 |
| 2008/0159567 A1 * | 7/2008 | Lesso et al. ................. 381/120 |
| 2009/0039947 A1 * | 2/2009 | Williams .................... 327/536 |
| 2009/0154733 A1 * | 6/2009 | Lesso et al. ................. 381/120 |

FOREIGN PATENT DOCUMENTS

| | | |
|---|---|---|
| EP | 0 822 478 A2 | 2/1998 |
| EP | 1 569 330 | 8/2005 |
| GB | 2 408 644 | 6/2005 |
| GB | 2 418 792 | 4/2006 |
| JP | 7-240636 | 9/1995 |
| JP | 8-191224 | 7/1996 |
| JP | 2001-185960 | 7/2001 |
| JP | 2002-198750 | 7/2002 |
| JP | 2005-260581 | 9/2005 |
| WO | WO 94/11799 | 5/1994 |
| WO | WO 01/78248 | 10/2001 |
| WO | WO 03/096520 | 11/2003 |
| WO | WO 2004/019485 | 3/2004 |
| WO | WO 2005/101627 | 10/2005 |
| WO | WO 2006/031304 | 3/2006 |

OTHER PUBLICATIONS

Linear Technologies LTC 1983-3/LTC 1983-5 "100mA Regulated Charge-Pump Inverters in ThinSOT" Technical Description, pp. 1-12.

Dallas Semiconductor MAXIM Application Note 656 "Design Trade Offs for Single-Supply Op Amps."

* cited by examiner

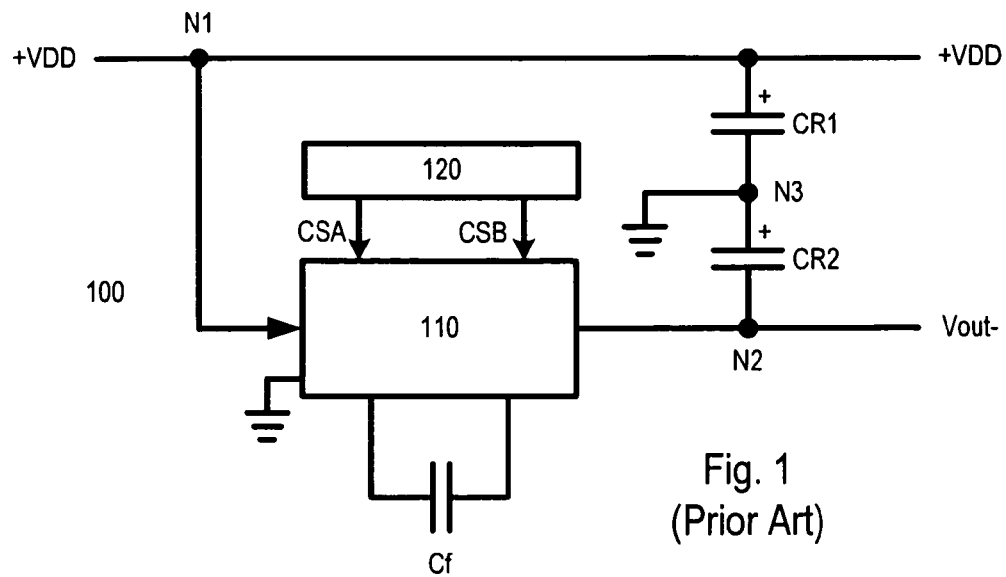
Fig. 1
(Prior Art)
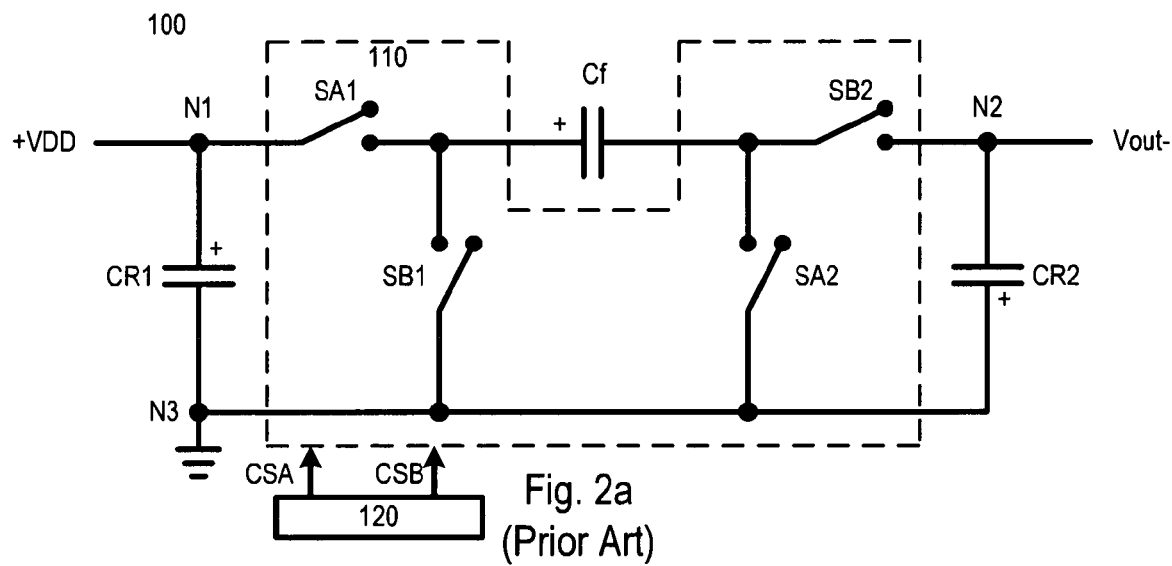
Fig. 2a
(Prior Art)
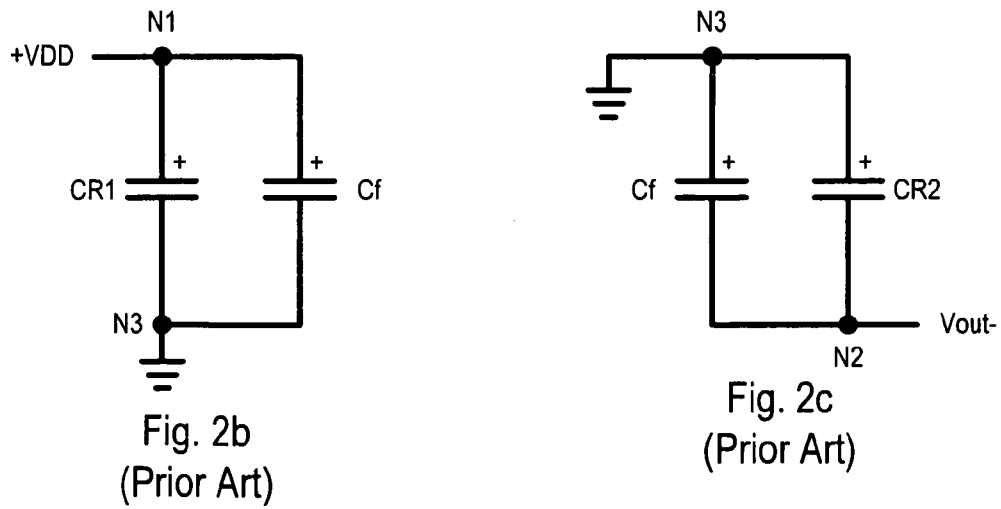
Fig. 2b
(Prior Art)
Fig. 2c
(Prior Art)

CHARGE PUMP CIRCUIT AND METHODS OF OPERATION THEREOF

The present invention relates to charge pump circuits and in particular charge pump circuits which provide dual rail output voltages.

Charge pump circuits are known in the art. These circuits are a type of DC-DC converter which use capacitors as energy storage device and are able to provide a power source at a higher or lower voltage than that obtained from an input source. Charge pump circuits are capable of high efficiencies, sometimes as high as 90-95%.

Charge pumps use some form of switching device(s) to control the connection of the capacitors to voltage sources and to one another, to typically obtain voltages other than the input voltage value. The charge pump includes a capacitor, typically known as a "flying capacitor", for transferring charge to one or more output capacitors, which will be referred to as "reservoir capacitors". Such charge pumps can be used to generate dual rail, that is bipolar, supply voltages from a single rail input voltage VDD. A drawback with known dual rail charge pumps is that they may, for example, produce an output voltage having a magnitude twice the input voltage (VDD), that is, one rail is at a voltage VDD, the other at a voltage −VDD, with reference to a common terminal. This can be very inefficient if such a charge pump is used, for example, to power circuitry that amplifies a signal that has a maximum amplitude much smaller than the amplifier circuitry's power supply +/−VDD. In such a case most of the output power (and therefore input power) is wasted in producing heat as opposed to driving the signal.

It is an aim of the present invention to address the above mentioned drawback.

In a first aspect of the invention there is provided a method of generating a split-rail voltage supply from a single input supply voltage received across an input terminal and a common terminal, the split-rail supply being output at first and second output terminals connected to the common terminal via respective first and second loads and also via respective first and second reservoir capacitors, the method using a single flying capacitor to generate the split rail supply with positive and negative output voltages together spanning a voltage approximately equal to the voltage of the input supply, and centered on the voltage at the common terminal.

In a further aspect of the invention there is provided a method of generating a split-rail voltage supply from a single input supply received across an input terminal and a common terminal, the split-rail supply being output at first and second output terminals connected to the common terminal via respective first and second loads and also via respective first and second reservoir capacitors, the method comprising connecting a flying capacitor between different ones of the terminals in a sequence of states, so as to transfer packets of charge repeatedly from the input supply to the reservoir capacitors via the flying capacitor thereby generating the split rail supply with positive and negative output voltages together spanning a voltage approximately equal to the voltage of the input supply, and centred on the voltage at the common terminal, without using a second flying capacitor.

In a further aspect of the invention there is provided a charge pump circuit for providing a plurality of supply voltages from an input voltage, the charge pump circuit having first and second output terminals and a common terminal for connection to first and second reservoir capacitors and one pair of flying capacitor terminals for connection to a flying capacitor, the circuit being operable to use the flying capacitor to generate positive and negative output voltages across the reservoir capacitors, the output voltages together spanning a voltage approximately equal to the input voltage, and centered on a voltage at the common terminal.

The method may include interleaving repetitions of at least first and second states, the first state being effective to divide the input voltage between the flying capacitor and first reservoir capacitor in series, the second state being effective to apply the flying capacitor's portion of the divided voltage across the second reservoir capacitor. The first state may be obtained by connecting the flying capacitor across the input terminal and the first output terminal, and the second state may be obtained by connecting the flying capacitor across the common terminal and the second output terminal.

A third state may be included within the sequence, the third state being effective to apply the flying capacitor's portion of the divided voltage across the first reservoir capacitor. The third state may be obtained by connecting the flying capacitor across the first output terminal and the common terminal. The third state may be included less frequently than the first and second states.

The method may include interleaving repetitions of fourth and fifth states, the fourth state being effective to charge up the flying capacitor to the input voltage, the fifth state being effective to divide the voltage on the flying capacitor between the first reservoir capacitor and second reservoir capacitor in series. The fourth state may be obtained by connecting the flying capacitor across the input terminal and the common terminal, and the fifth state may be obtained by connecting the flying capacitor across the first output terminal and the second output terminal.

The sequence of states may be varied according to load conditions. The variation in the sequence of states may include lowering the frequency of inclusion of the second state should the load be asymmetrical. The first reservoir capacitor may be charged only when the voltage at the first output terminal falls below a first threshold value and the second reservoir capacitor may be charged only when the voltage at the second output terminal falls below a second threshold value. The at least one the first and second threshold values may be settable by a user therefore allowing control of the voltage levels at the first and second output terminals.

A signal may be selected to be input into the input supply terminal and therefore controlling the voltage levels at the first and second output terminals.

Depending on the state, one of the terminals of the flying capacitor may be connected independently to one of the input terminal, the first output terminal or the common terminal. Alternatively or in addition, depending on the state, the other terminal of the flying capacitor may be connected independently to one of the first output terminal, the common terminal or the second output terminal.

In a further aspect of the invention there is provided a charge pump circuit for providing a plurality of output voltages, the circuit comprising:
  an input terminal and a common terminal for connection to an input voltage,
  first and second output terminals for outputting the plurality of output voltages, the output terminals in use being connected to the common terminal via respective first and second loads and also via respective first and second reservoir capacitors,
  first and second flying capacitor terminals for connection to a flying capacitor, and
  a network of switches that is operable in a plurality of different states for interconnecting the terminals,
  the circuit being operable to generate positive and negative output voltages together spanning a voltage approximately equal to the input voltage and centered on the voltage at the common terminal, using only the flying capacitor and first and second reservoir capacitors.

It should be noted that the term "together spanning a voltage approximately equal to the input voltage, and substantially centered on the voltage at the common terminal", should be taken, for example, to cover the situation when the circuit is lightly loaded, wherein the output voltages levels will, in reality, be +/−half the input voltages less Iload.Rload, where Iload equals the load current and Rload equals the load resistance.

In a yet further aspect of the invention there is provided a charge pump circuit for providing a plurality of output voltages, the circuit comprising:

an input terminal and a common terminal for connection to an input voltage, first and second output terminals for outputting the plurality of output voltages, the output terminals in use being connected to the common terminal via respective first and second loads and also via respective first and second reservoir capacitors, one or more pairs of flying capacitor terminals, each pair comprising first and second flying capacitor terminals for connection to one or more flying capacitors, the number of flying capacitors equaling n, a network of switches that is operable in a plurality of different states for interconnecting the terminals, and a controller for operating the switches in a sequence of the states, the sequence being adapted repeatedly to transfer packets of charge from the input terminal to the reservoir capacitors via the flying capacitors depending on the state thereby (in a steady state) generating positive and negative output voltages each of a magnitude up to substantially a fraction of the input voltage wherein the fraction of the input voltage equals 1/(n+1), where n is an integer equal to or greater than one.

The term "fraction" is used here in its mathematical sense, that is a ratio of two whole numbers, and will in fact be a proper fraction.

The number of flying capacitor terminals may be 2 n or may be fewer if some capacitors have common terminals.

Also provided for is a charge pump circuit for providing a plurality of supply voltages from an input voltage, the charge pump circuit having first and second output terminals and a common terminal for connection to first and second reservoir capacitors and one pair of flying capacitor terminals for connection to a flying capacitor, and a switch network comprising:

a first switch for connecting the input terminal to the a first one of the flying capacitor terminals, a second switch for connecting the first flying capacitor terminal to the first output terminal, a third switch for connecting the first flying capacitor terminal to the common terminal, a fourth switch for connecting the second one of the flying capacitor terminals to the first output terminal, a fifth switch for connecting the second flying capacitor terminal to the common terminal, and a sixth switch for connecting the second flying capacitor terminal to the second output terminal.

Also disclosed is an audio apparatus including a charge pump circuit as disclosed herein, the charge pump having a flying capacitor connected to the first and second flying capacitor terminals and first and second reservoir capacitors connected respectively between the first output terminal and the common terminal and the second output terminal and the common terminal, the audio apparatus further comprising audio output circuitry connected to be powered by the first and second output voltages of the converter. The audio apparatus may be portable. The audio apparatus may be comprised within a communications apparatus. The audio apparatus may be an in-car audio apparatus. The audio apparatus may be comprised within a headphone apparatus or a stereo headphone apparatus. The audio apparatus may include an audio output transducer connected as a load connected to an output terminal of the audio output circuitry.

Further optional features of the invention are as disclosed in the appended claims.

BRIEF DESCRIPTION OF THE DRAWINGS

Embodiments of the invention will now be described, by way of example only, by reference to the accompanying drawings, in which:

FIG. 1 shows a prior art inverting charge pump circuit;

FIG. 2a shows the same circuit as FIG. 1 with detail of the switch array shown;

FIGS. 2b and 2c show equivalent circuits of the circuit of FIG. 2a, in two states used in operation;

DETAILED DESCRIPTION OF THE EMBODIMENTS

Figure 3:
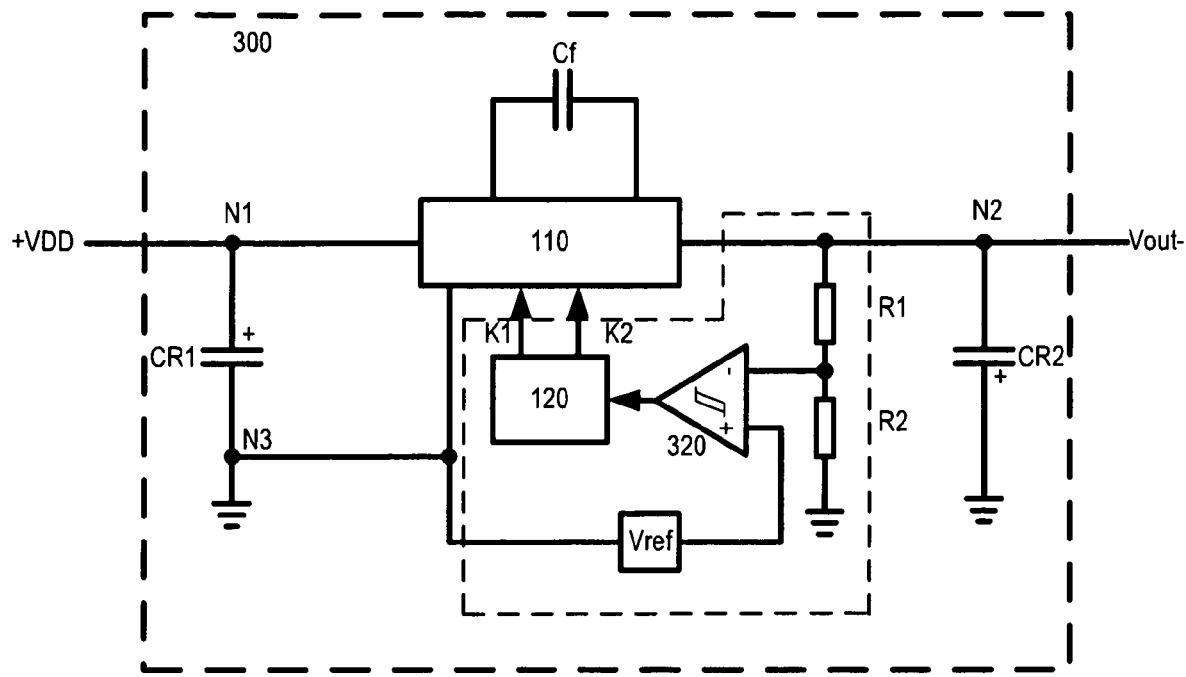
FIG. 3 shows a variation on the circuit of FIG. 1, operating in a closed loop configuration.

FIG. 1 illustrates a prior art inverting charge-pump (ICP) circuit 100 which generates a negative output voltage (Vout−) from a positive input voltage (+VDD). In ideal conditions Vout− will substantially equal −VDD thus resulting in a total voltage across the nodes N1-N2 of 2xVDD. The circuit 100 comprises three capacitors, one flying capacitor Cf and two reservoir capacitors CR1, CR2, and a switch array 110. Circuit 100 is controlled by a controller 120 which controls the switch array 110 thus causing circuit 100 to switch between two main states as explained below.

FIG. 2a illustrates the switch array 110 associated with the ICP circuit 100. FIGS. 2b and 2c show equivalent circuits for the two main charging/discharging states of operation. Switches SA1 and SA2 and switches SB1 and SB2 are arranged as shown and respectively operated by common control signals (CSA and CSB).

To generate the voltage Vout−, the controller operates the switch array 110 to repeat the following four steps:

1. initially all the switches are open; then
2. switches SA1 and SA2 are closed (SB1 and SB2 remain open) resulting in the ICP circuit 100 operating in a first state. The flying capacitor Cf is connected between the input voltage node N1 and the common reference voltage node N3 (as illustrated in FIG. 2b). Therefore the flying capacitor Cf charges up to voltage +VDD; then
3. switches SA1 and SA2 are opened (SB1 and SB2 remain open); then
4. switches SB1 and SB2 are closed (SA1 and SA2 remain open) resulting in the ICP circuit 100 operating in a second state. The flying capacitor Cf is now connected in parallel with the negative reservoir capacitor CR2, that is its connected across the common reference voltage node N3 and the output voltage node N2 (as illustrated in FIG. 2c). Assuming capacitor CR2 is initially charged to zero volts in this first cycle, capacitor CR2 will share charge with capacitor Cf, to give an equal voltage across each capacitor. Since the positive plates of capacitors Cf and CR2 are connected to the common reference voltage node N3 (ground), node N2 sees a voltage somewhat more positive than −VDD relative to node N3, depending on the respective sizes of Cf and CR2.

The process repeats itself starting at step 1 when all the switches are open. In each 4-step cycle, capacitor CR2 will be further charged, eventually reaching a steady state after a plurality of 4-step cycles. By this time, capacitor CR2 is already charged to (and therefore Vout− equals) substantially −VDD, and consequently Cf no longer adds any further significant charge.

The switch array 110 may be operated in an open-loop configuration as described above where the switching frequency of the switches is substantially fixed. The actual switching frequency can be made dependent upon the application in which the circuit is being used and can be of the magnitude of KHz to MHz, for example.

If a load is applied to Vout−, it will continuously discharge capacitor CR2. This charge is then replaced by charge from capacitor Cf during state 2, resulting in Vout− being somewhat more positive than −VDD. The average difference and voltage ripple will depend on the values of Cf, CR2, the switching frequency and the load characteristics.

FIG. 3 shows an alternative prior art ICP circuit 300 in which the switch array 110 is operated in a closed-loop configuration. This alternative prior art ICP circuit 300 differs from that illustrated in FIG. 1 in having its switch array control logic 310 dependent on output voltage Vout−. The ICP circuit 300 comprises a voltage divider R1, R2 and a comparator 320, as well as the switch array 110 and capacitors Cf, CR1, CR2 as before. Regulation of the output voltage Vout− on node N2 is achieved by sensing the output voltage Vout− through the internal resistor divider R1, R2 and enabling the switch array 110 when the voltage Vout− across capacitor CR2 becomes more positive than the comparator's 320 reference input Vref. When the switch array 110 is enabled, 2-phase non-overlapping clock signals K1, K2 control the switches (not illustrated). One clock signal (K1) controls switches SA1 and SA2 which enables the flying capacitor Cf to charge up to the input voltage +VDD (see FIG. 2b), while the other clock signal (K2) controls switches SB1 and SB2 which enables the output reservoir capacitor CR2 to charge up to voltage Vout− (see FIG. 2c).

It should be noted that the output voltage Vout− can be regulated such that it is anywhere between approximately ground potential and −VDD, however the charge pump itself is most efficient when the output voltage Vout− equals −VDD. In practice the target voltage will probably be set slightly above −VDD in order to reduce ripple.

The problem associated with these prior art ICP circuits (100, 300) is that they can only generate output voltages that have a rail-to-rail magnitude greater than the input voltage. This can be disadvantageous in certain applications, as it may not allow the circuitry being supplied to run efficiently, for example when such an ICP circuit (100, 300) is being used to power circuitry that amplifies a signal with a maximum amplitude much smaller than the amplifier circuitry's power supply +/−VDD.

Figure 4A:
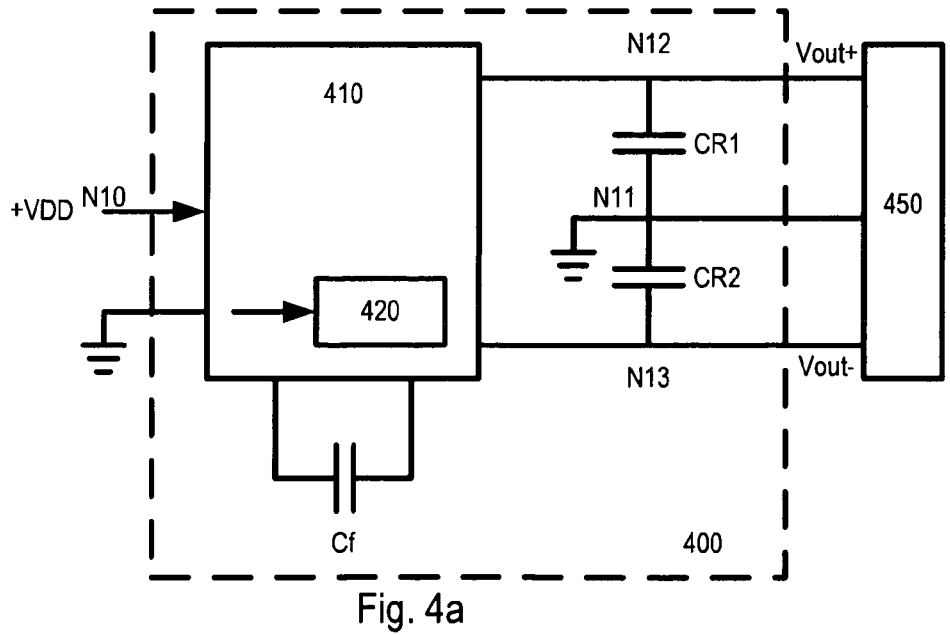
FIG. 4a shows a Level Shifting Charge Pump circuit according to an embodiment of the invention.

FIG. 4a is a block diagram of a novel inverting charge pump circuit, which we shall call a "Level Shifting Charge-Pump" (LSCP) 400. Again there are two reservoir capacitors CR1 and CR2, a flying capacitor Cf and a switch array 410 controlled by a switch controller 420. However, in this arrangement, reservoir capacitor CR1 is not connected directly to the input supply voltage VDD, but only via the switch array 410. It should be noted that LSCP 400 is configured as an open-loop charge-pump. Therefore, LSCP 400 relies on the respective loads (not illustrated) connected across each output N12-N11, N13-N11 remaining within predetermined constraints. The LSCP 400 outputs two voltages Vout+, Vout− that are referenced to a common voltage supply (node N11). Connected to the outputs Vout+, Vout−, N11, and shown for illustration only, is a load 450. In reality this load 450 may be wholly or partly located on the same chip as the power supply, or alternatively it may be located off-chip. This concept is considered in further detail when discussing FIGS. 11a and 11b below.

LSCP 400 operates such that, for an input voltage +VDD, the LSCP 400 generates outputs each of a magnitude which is a half of the input voltage VDD. In other words, the output voltages generated in this first mode are nominally of magnitude +VDD/2 and −VDD/2. When lightly loaded, these levels will, in reality, be +/−(VDD/2−Iload.Rload), where Iload equals the load current and Rload equals the load resistance. It should be noted that, in this case, the magnitude (VDD) of output voltage across nodes N12 & N13 is the same, or is substantially the same, as that of the input voltage (VDD) across nodes N10 & N11, but shifted.

This particular form of charge pump has significant advantages over known circuits, in particular because of the ability to generated a reduced, bipolar supply using only a single flying capacitor. Prior circuits for generating reduced output voltages requires additional flying capacitors. The flying capacitor and reservoir capacitors are often of a size that they need to be located off-chip, and so eliminating one capacitor and two IC pins is highly beneficial.

Figure 4B:
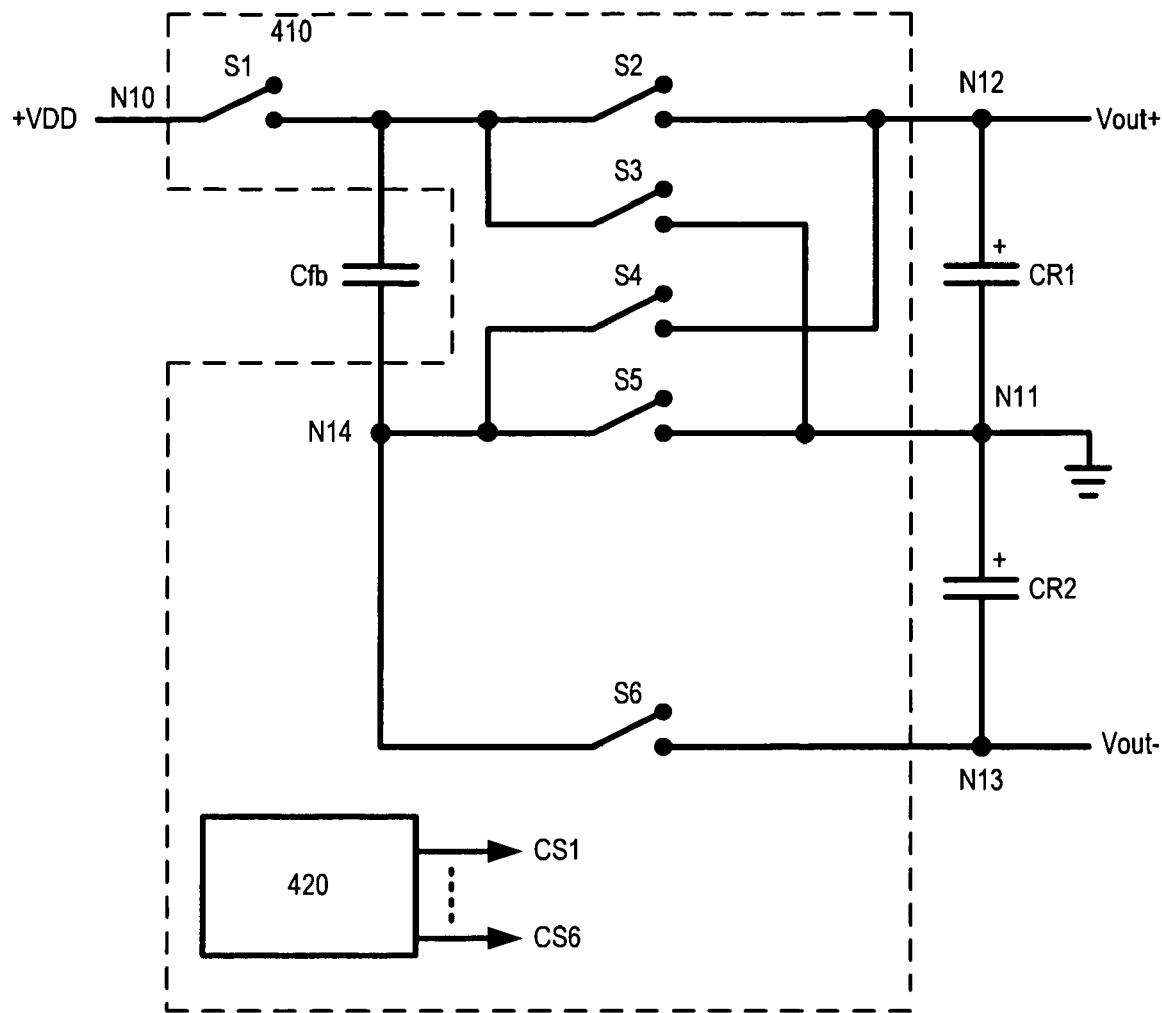
FIG. 4b shows the same circuit as FIG. 4a with detail of the switch array shown.

FIG. 4b shows more internal detail of the LSCP 400 and, in particular, detail of the switch array 410 is shown. The switch array 410 comprises six switches S1-S6 each controlled by corresponding control signal CS1-CS6 from the switch controller 420. The switches are arranged such that first switch S1 is connected between the positive plate of the flying capacitor Cf and the input voltage node N10, the second switch S2 is between the positive plate of the flying capacitor and first output node N12, the third switch S3 is between the positive plate of the flying capacitor and common terminal N11, the fourth switch S4 is between the negative plate of the flying capacitor and first output node N12, the fifth switch S5 is between the negative plate of the flying capacitor and common terminal N11 and the sixth switch S6 is between the negative plate of the flying capacitor and second output terminal N13. These switches are the ones appropriate to operate as described herein. The provision of further switches to enable other modes of operation is of course not excluded.

It should be noted that the switches can be implemented in a number of different ways (for example, MOS transistor switches or MOS transmission gate switches) depending upon, for example, an integrated circuits process technology or the input and output voltage requirements. The selection of appropriate implementations is well within the capability of the skilled reader.

The LSCP 400, in one embodiment, has three basic states of operation repeated in high-frequency cycles of three phases, which may be referred to as P1, P2, P3.

Figure 5A:
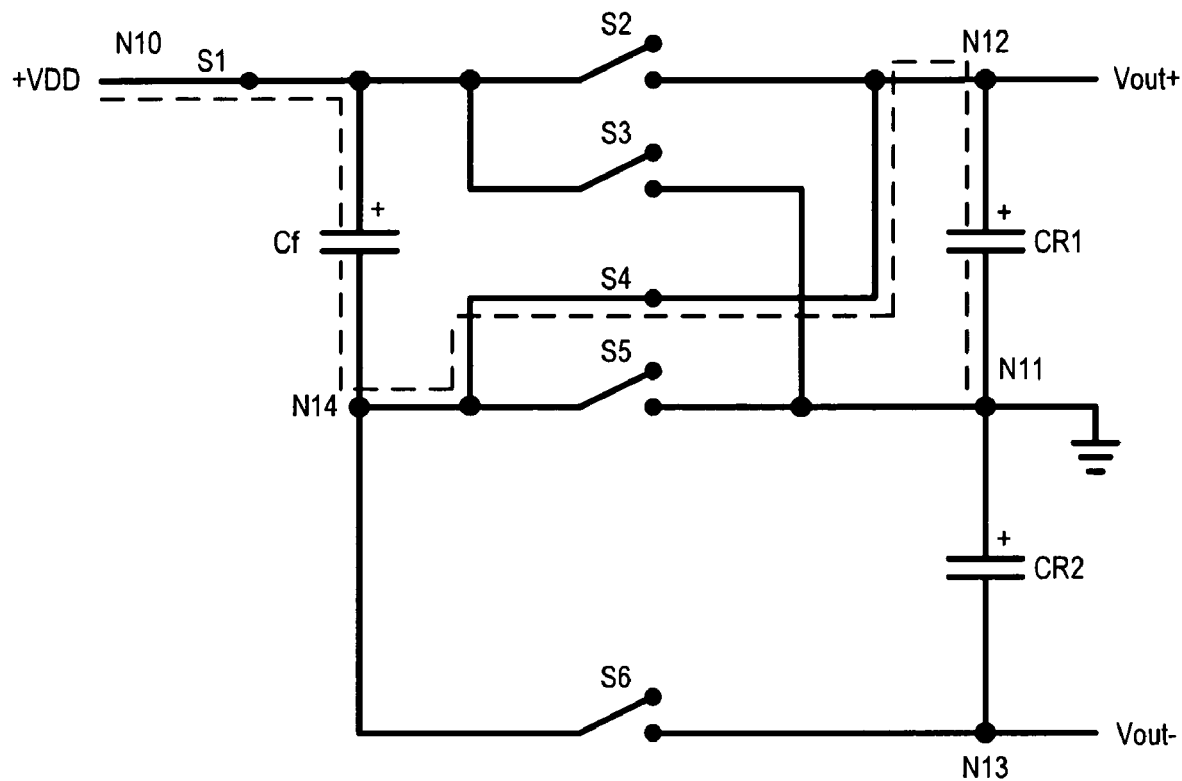
FIGS. 5a and 5b show, respectively, the circuit of FIG. 4 operating in state 1 and an equivalent circuit of this state.
Figure 5B:
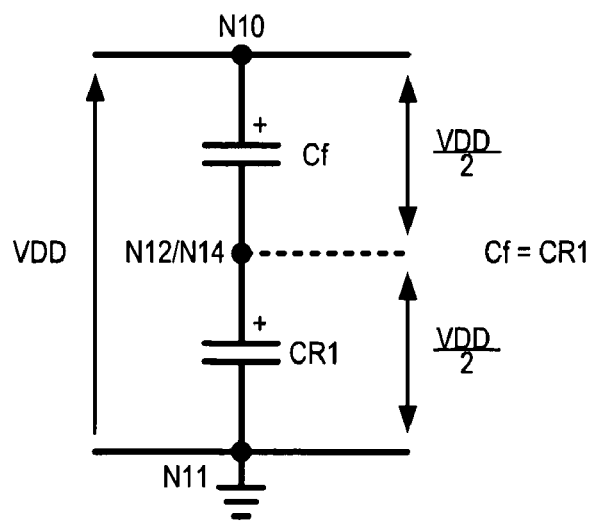

FIGS. 5a and 5b show the switch array 410 operating in a first state, "State 1". Referring to FIG. 5a, switches S1 and S4 are closed such that capacitors Cf and CR1 are connected in series with each other and in parallel with the input voltage +VDD. Therefore, capacitors Cf and CR1 share the input voltage +VDD that is applied across them. FIG. 5b shows an equivalent circuit for the State 1 operation with voltage +VDD effectively applied across nodes N10 & N11.

It is preferable for applications that require symmetrical, but opposite polarity, output voltages, that the values of capacitors Cf and CR1 are equal such that each capacitor Cf, CR1 changes voltage by an equal increment when connected in series across a voltage source. If both capacitors are initially discharged, or indeed previously charged to any equal voltages, they will end up each with a voltage equal to half the applied voltage source, in this case one half of the input voltage VDD.

Figure 6A:
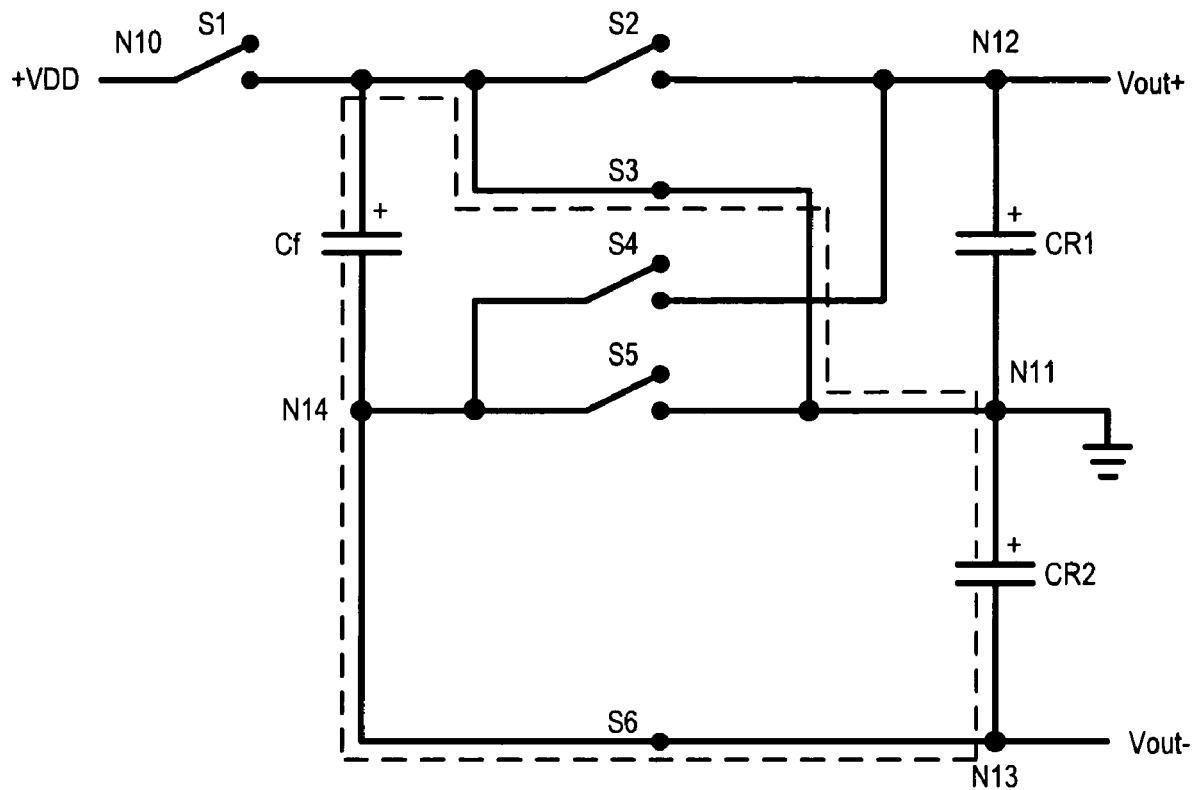
FIGS. 6a and 6b show, respectively, the circuit of FIG. 4 operating in state 2 and an equivalent circuit of this state.
Figure 6B:
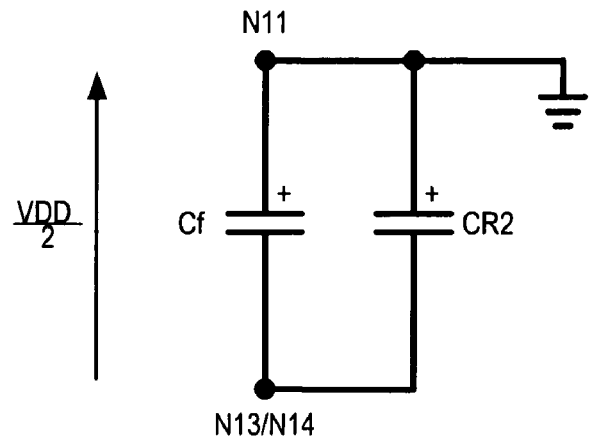

FIGS. 6a and 6b show the switch array 410 operating in a second state, "state 2". Referring to FIG. 6a, switches S3 and S6 are closed such that capacitors Cf and CR2 are connected in parallel with each other and between nodes N11 and N13. Therefore, the voltage across capacitor Cf equalises with that across capacitor CR2. FIG. 6b shows an equivalent circuit for this state 2 condition.

It should be noted that the value of reservoir capacitor CR2 does not necessarily need to be the same as that of flying capacitor Cf. If capacitor CR2 is much larger than capacitor Cf, it will require more state sequences to charge up to or close to VDD/2. The value of reservoir capacitor CR2 should be chosen depending upon expected load conditions and required operating frequency and output ripple tolerance.

Over a plurality of cycles alternating only States 1 and 2, the voltages across the capacitors Cf and CR2 would, under ideal conditions, converge to a voltage +/−VDD/2. However, the presence of a significant load on the LSCP's 400 output terminals will result in a respective voltage droop in Vout+, Vout− away from +/−VDD. If the load is symmetric, and there is equal current magnitude on both Vout+ and Vout−, then the symmetry of the system will result in both outputs drooping by the same amount.

However, if for example there is a significant load on Vout+ but no load or a light load on Vout−, then the voltage across capacitor CR1 will reduce. This will result in a larger voltage across capacitor Cf at the end of State 1 which will then be applied to capacitor CR2 in State 2. If only States 1 and 2 were used, the flying capacitor Cf would then be connected in series with capacitor CR1 in State 1 but still having a larger voltage across it, even initially. Therefore, voltages Vout+ and Vout− will both tend to droop negatively, that is to say that the common mode is not controlled.

Figure 7A:
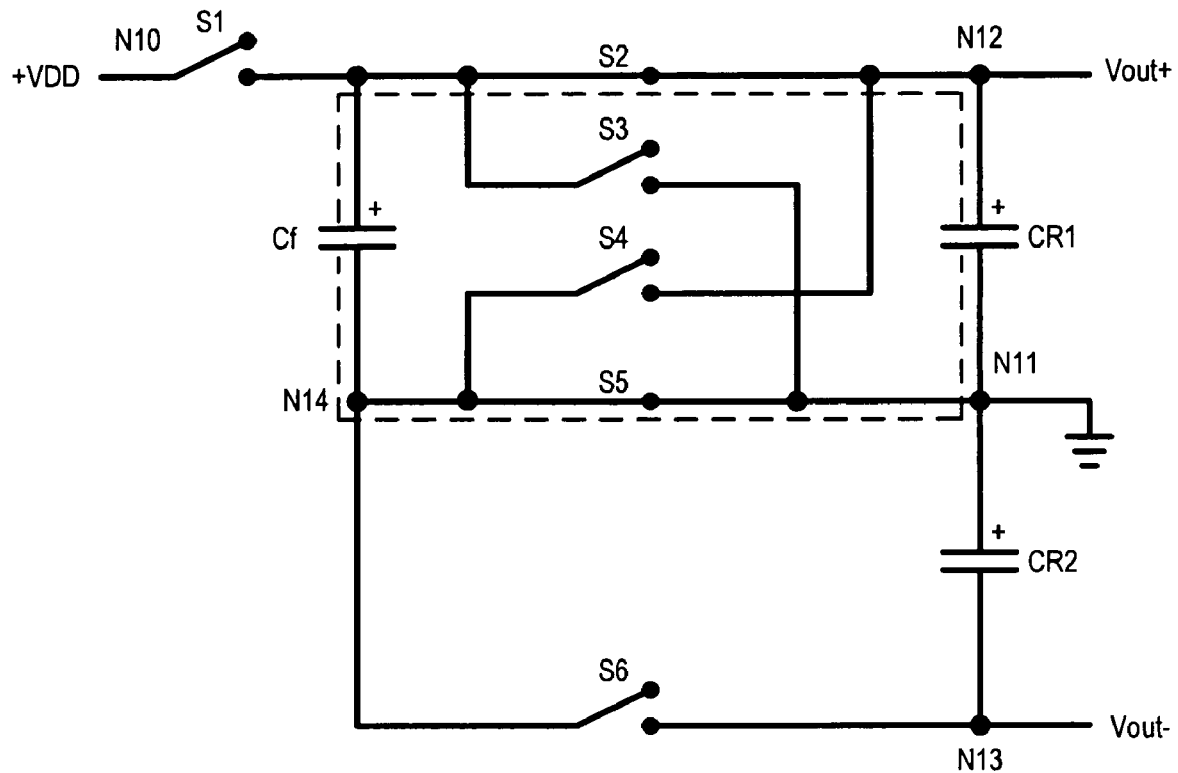
FIGS. 7a and 7b show, respectively, the circuit of FIG. 4 operating in state 3 and an equivalent circuit of this state.
Figure 7B:
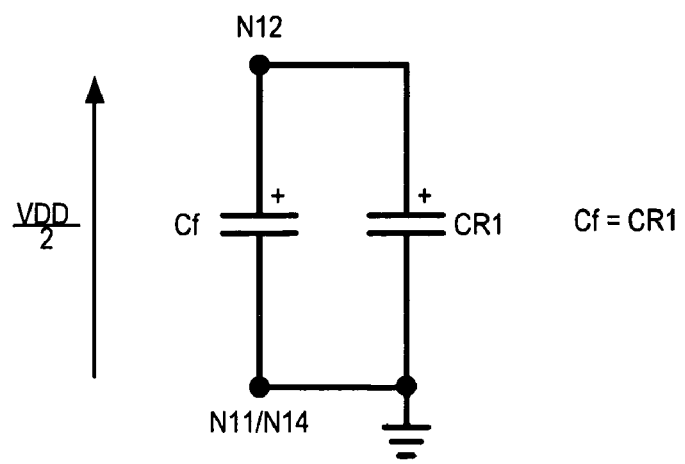

To avoid this effect, a third state, State 3, is introduced and States 1 to 3 are repeated in Phases 1 to 3 over successive cycles. FIGS. 7a and 7b show the switch array 410 operating in this State 3 operation. Referring to FIG. 7a, in state 3, switches S2 and S5 are closed such that capacitors Cf and CR1 are connected in parallel with each other and between nodes N11 and N12. Therefore, both capacitors Cf and CR1 become charged up to an equal voltage, despite any difference between of their previous voltages. In steady state (after many cycles) this becomes approximately VDD/2. FIG. 7b shows an equivalent circuit for this State 3 condition.

The circuit, therefore ends State 3 with equalised voltages, after which it returns to State 1. Consequently the circuit will, in principle, enter Phase 1 of the next cycle in State 1 with Vout+=+VDD/2, depending upon load conditions and switching sequence.

In States 2 and 3, the voltages across the various capacitors that are connected in parallel may not actually, in practice, completely equalise in a single sequence, particularly if the switching frequency is high, relative to the LSCP's R-C time constant. Rather, in each sequence of states a contribution of charge will be passed from capacitor to capacitor. This contribution will bring each output voltage to the desired level under zero, or low, load conditions. Under higher load conditions, the output reservoir capacitors CR1, CR2 will typically achieve a lower voltage (with some ripple). The size of each of the capacitors needs simply to be designed such that the reduction of common mode drift is within acceptable bands for all expected load conditions, Alternatively, or in addition, larger switches, with less on-resistance, could be employed.

Figure 8:
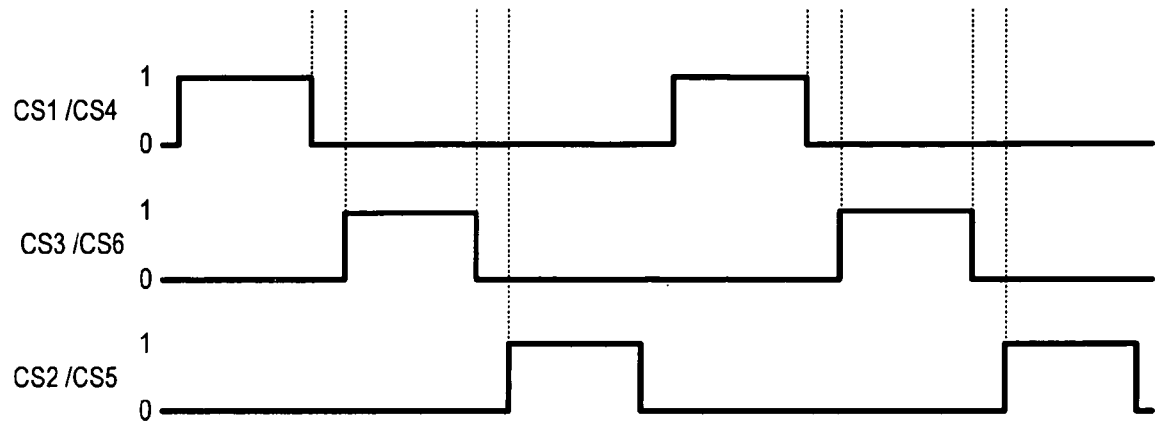
FIG. 8 is a timing diagram showing three switch control signals for the circuit of FIG. 4 operating in an embodiment of the invention.

FIG. 8 illustrates the non-overlapping control signals (CS1-CS6) for controlling the switches (S1-S6) during the three states, 1, 2 and 3 of the main operational embodiment. As discussed above, this represents only one example out of many possibilities for the controlling sequence.

It should be appreciated that the open-loop sequencing of the above three states does not necessarily need to be observed. For example the state sequences could be: 1, 2, 3, 1, 2, 3 . . . (as described above); or 1, 3, 2, 1, 3, 2 . . . ; or 1, 2, 1, 3, 1, 2, 1, 3. It should also be apparent that it is not necessary that the third state be used as often as the other two states, for instance a sequence of 1, 2, 1, 2, 1, 2, 3, 1 . . . can be envisaged. It may even be envisaged to dispense with the third state altogether, albeit only in the case of well-balanced loads, or with alternative schemes for common-mode stabilisation.

Other switching and sequencing scenarios exist. For example, in one alternative operational embodiment: state 1 could be replaced by a fourth state, "State 4" whereby switches S1 and S5 are closed (all other switches are open). In this state capacitor Cf charges up to input voltage +VDD. A fifth state, "State 5" would then operate with switches S2 and S6 closed (all other switches open) such that flying capacitor Cf is connected across reservoir capacitors CR1 and CR2 in series (which, in this scenario, may be equal in capacitance). This particular example of an alternative switching and sequencing scenario has the drawback that there is no common-mode control and therefore such a switching and sequencing scenario would suffer from common-mode drift. However, this common-mode drift can be "reset" by altering the switching sequence at appropriate intervals during the "normal" switching and sequencing cycle. These alterations can be predetermined, or initiated in response to observed conditions.

TABLE 1

|  | S1 | S2 | S3 | S4 | S5 | S6 |
| --- | --- | --- | --- | --- | --- | --- |
| State 1 | 1 | 0 | 0 | 1 | 0 | 0 |
| State 2 | 0 | 0 | 1 | 0 | 0 | 1 |
| State 3 | 0 | 1 | 0 | 0 | 1 | 0 |

TABLE 1-continued

|  | S1 | S2 | S3 | S4 | S5 | S6 |
|---|---|---|---|---|---|---|
| State 4 | 1 | 0 | 0 | 0 | 1 | 0 |
| State 5 | 0 | 1 | 0 | 0 | 0 | 1 |

Table 1 illustrates the switch (S1-S6) states for the five states, a "0" representing an open switch and a "1" representing a closed switch. States 1, 2 and 3 are used in the main operational embodiment, while the states 4 and 5 are used in the alternative operational embodiment.

It should be noted that the sizes of capacitors Cb, CR1, CR2, can be selected to meet required the ripple tolerances (versus size/cost) and consequently clock phase duration for each state need not necessarily be of ratio 1:1:1.

While the above describes an embodiment wherein outputs of +/−VDD/2 are generated, it will be understood by the skilled person that the above teaching could be used to obtain outputs of any fraction of VDD by increasing the number of flying capacitors Cf and altering the switch network accordingly. The relationship between output and input in this case is Vout+/−=+/−VDD/(n+1) where n equals the number of flying capacitors Cf. It will also be appreciated that circuits with more than one flying capacitor as described will still be capable of generating outputs of +/−VDD/2 as well as outputs for every intermediate integer denominator between +/−VDD/2 and +/−VDD/(n+1) depending on its control. For example, a circuit with two flying capacitors can generate outputs of VDD/3 and VDD/2, one with three flying capacitors can generate outputs of VDD/4, VDD/3 and VDD/2 and so on.

Figure 9:
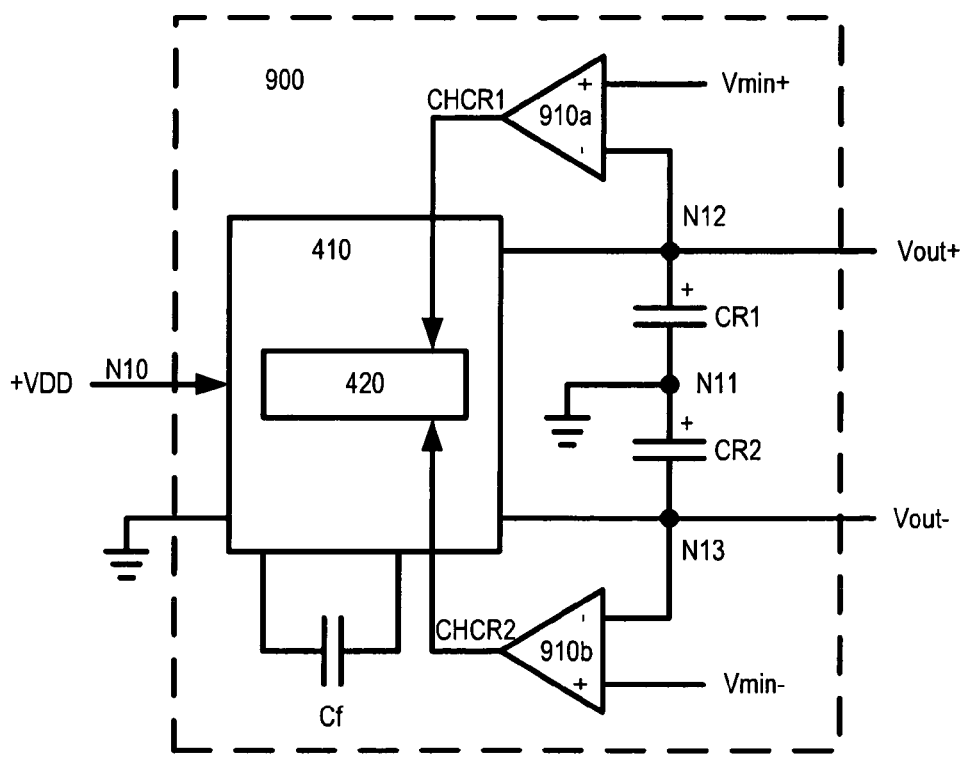
FIG. 9 shows a variation on the circuit of FIG. 4, operating in a closed loop configuration.

FIG. 9 illustrates a similar LSCP 900 circuit as illustrated in FIG. 4 except that the LSCP 900 also includes two comparators 910a, 910b for regulating the two output voltages.

It should be noted that LSCP 900 represents a closed-loop LSCP. Each of the comparators 910a, 910b compares their respective charge pump output voltages (Vout+, Vout−) with a respective threshold voltage (Vmin+, Vmin−) and outputs a respective charge signal CHCR1 and CHCR2. These charge signals CHCR1, CHCR2 are fed into the switch control module 420 to control the switch array 410 causing the LSCP 900 to operate charging either the relevant reservoir capacitor. If either output voltage droops past its respective threshold, the charge pump is enabled; otherwise the charge pump is temporarily stopped. This reduces the power consumed in switching the switches, especially in conditions of light load.

This scheme allows output voltages up to +/−VDD/2. It should be further noted that in this FIG. 9 configuration, the LSCP 900 may also be used to generate higher voltages, but with a drop in efficiency. In this case the reference voltages (Vmin+/Vmin−) can be adjusted to adjust the output voltages accordingly. The flying capacitor Cf is charged up to +VDD (via switches S1 and S5) and then connected in parallel across either reservoir capacitor CR1 (via switches S2, S5) or CR2 (via switches S3, S6) to raise their voltages to the levels set by the reference voltages. Such an operation increases the ripple voltages on the reservoir capacitors CR1, CR2 but it also reduces switching losses. However, by scaling the reservoir capacitors CR1, CR2 relative to the charging capacitor Cf, the ripple voltages can be reduced.

Figure 10:
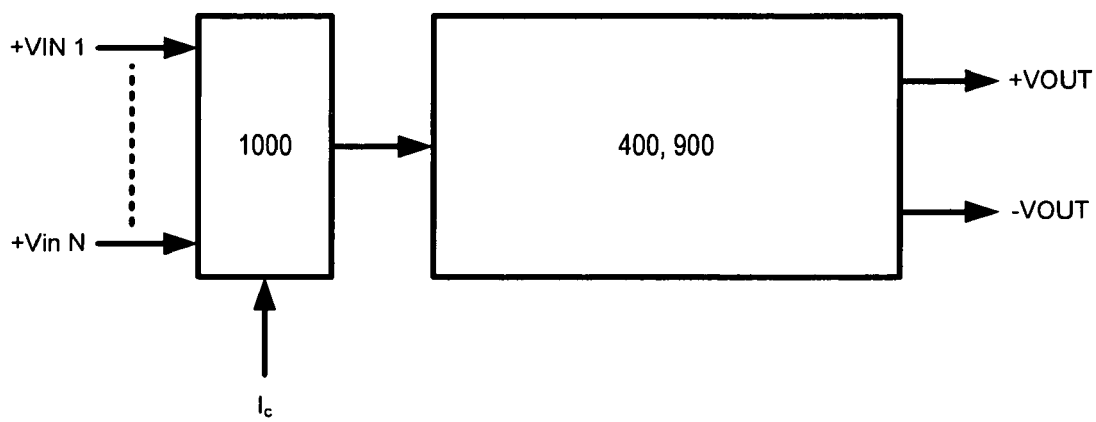
FIG. 10 shows a further embodiment of the invention wherein one of a number of different input voltage values may be selected as an input voltage to any of the Level Shifting Charge Pumps disclosed herein.

FIG. 10 illustrates a further embodiment of the invention wherein one of a number of different input voltage values may be selected as an input voltage to the LSCP 400, 900. It shows an input selector 1000 having a number of different voltage inputs (+Vin 1 to +Vin N), the actual input chosen being determined by control input Ic. The chosen voltage level then serves as the input voltage VDD for the level shifting charge pump 400, 900.

Figure 11A:
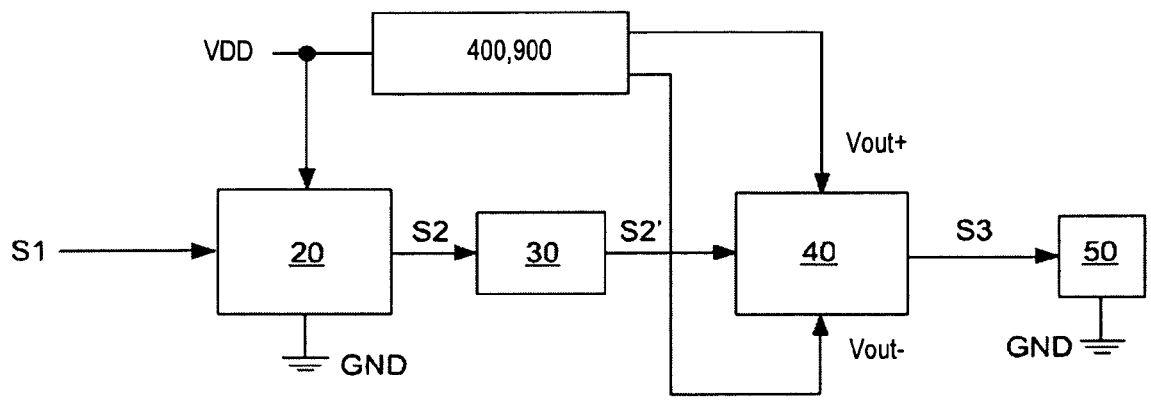
FIGS. 11a and 11b show in block schematic form two amplifier circuits in which any of the Level Shifting Charge Pumps embodying the present invention may be used.

FIG. 11a represents a typical application wherein dual rail supply voltages Vout+ and Vout− are generated by such a charge pump 400, 900 as herein described, the charge pump 400, 900 being supplied from a single rail supply voltage VDD for example. Alternatively, the charge pump 400, 900 may be supplied by multiple supply voltages as illustrated in FIG. 10. Labels VDD, Vout+ etc. are to be interpreted in the description associated with FIGS. 11a, and 11b, to refer to either the respective terminals or the voltage at that terminal, according to context.

Referring to FIG. 11a, the supply voltage VDD is illustrated as supplying processing circuitry 20. The input signal S1 maybe an analogue signal or a digital signal. In the case where S1 is an analogue signal then the processing circuitry 20 will be purely analogue type circuitry such as op-amps, multiplexers, gain blocks etc. In the case where S1 is a digital signal and the output stage is analogue, then the processing circuitry 20 may be a mixture of digital and analogue circuitry where signal S1 is fed, either directly or through some digital signal processing, into a DAC (not illustrated) and the output of the DAC is then fed into the analogue circuitry as mentioned above.

The processing circuitry 20 outputs a processed signal S2 that in this particular embodiment is an analogue signal that is passed into a level shifter 30. Level shifter 30 may be implemented by a DC-blocking capacitor, for example. An output amplifier 40 is powered by the dual rail supply voltages Vout+ and Vout− generated by the charge pump 400, 900, at levels +/−VDD/2 (or other fractions of VDD)

The input signal S1, if analogue, and analogue signals in the processing circuitry 20, will normally be referenced midway between ground potential and VDD, whereas the level shifted signal S2' is referenced about ground, as required by the output amplifier operating from the split rail supply Vout+, Vout−.

The level shifted signal S2' is fed into the output amplifier 40 which outputs an amplified output signal S3 which is fed into a ground referenced load in the form of signal transducer 50. In the case where the output amplifier 40 is a switching (Class D or PWM) amplifier, or a 1-bit digital (sigma-delta) type output stage, the signals S1, S2 may be digital in form right through to input to output, or may begin in analogue form and be converted to digital form in the processing circuit 20.

Figure 11B:
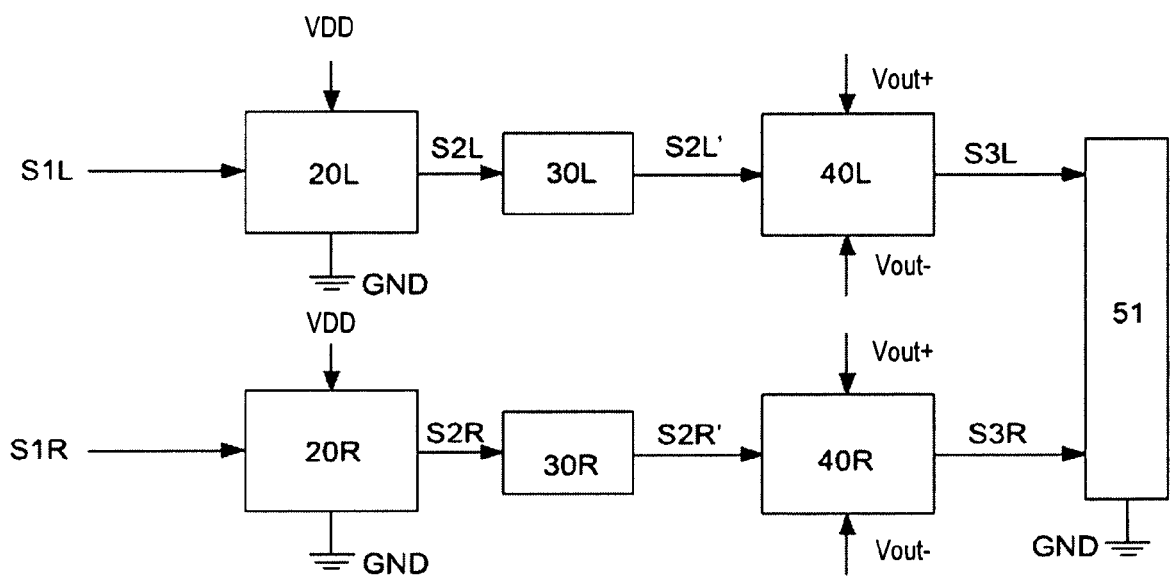

FIG. 11b illustrates a more specific application of the arrangement of FIG. 11a: the charge pump 400, 900 and supply connections have been omitted for clarity. The application in this example is a stereo amplifier in which the load is a stereo headphone 51. The signal processing elements of the amplifier are duplicated to process left and right channel signal, as indicated by the suffixes 'L' and 'R' on their reference signs. The supply voltages Vout+ & Vout− can be shared by both channels, although independent supplies for different channels would be possible if the application demands it. One area of application is in portable audio apparatus such as MP3 players for example where the split rail supply allows a DC-coupled output, which is desirable to maintain the bass response without having to use large decoupling capacitors.

Other possible application areas where the ability to generate a split rail supply include: (1) voltage supplies for circuits handling analogue composite video signals, where a ground-referenced DC-coupled output signal can avoid black-level droop; and (2) line drivers for data links or modems such as ADSL where a ground-referenced DC-coupled output signal can reduce baseline wander effects.

For cost and size reasons, it is important to be able to integrate the functions of an MP3 player, mobile phone or any other application into a small number of integrated circuits. Therefore it is advantageous to integrate the circuitry for supply voltage generation, in this case the charge pump 400, 900, together with the functional circuitry 20, 30, 40 etc. Generally speaking, the charge pump 400, 900 includes a capacitor which cannot realistically be integrated and has to be located off-chip, with consequences for chip-pin-count and overall circuit size. Since many circuits require supplies of dual polarity (split rail supplies), this has prompted the development of voltage generation circuits that are capable of generating two (or more) output voltage supplies using a single capacitor, rather than a capacitor per required output voltage.

Many other modifications in the control scheme, the form of the controller and even specifics of the switch network may be varied. The skilled reader will appreciate that the above and other modifications and additions are possible to these circuits, without departing from the spirit and scope of the invention as defined in the appended claims. Accordingly, the above described embodiments are presented to illustrate rather than limit the scope of the invention. For interpreting this specification and claims, the reader should note that the word "comprising" does not exclude the presence of elements or steps other than those listed in a claim, the singular article "a" or "an" does not exclude a plurality (unless the context requires otherwise), and a single element may fulfil the functions of several elements recited in the claims. Any reference signs in the claims shall not be construed so as to limit their scope.

Where a claim recites that elements are "connected" or are "for connecting", this is not to be interpreted as requiring direct connection to the exclusion of any other element, but rather connection sufficient to enable those elements to function as described. The skilled reader will appreciate that a good, practical design might include many auxiliary components not mentioned here, performing, for example, start-up and shutdown functions, sensing functions, fault protection or the like, some of which have been mentioned already, and none of which detract from the basic functions characteristic of the invention in its various embodiments described above in the claims.

Labels Vout+, Vout− and VDD etc. are to be interpreted in throughout the above description to refer to either the respective terminals or the voltage at that terminal, according to context.

In addition to variations and modifications within the charge pump circuit itself, the invention encompasses all manner of apparatuses and systems incorporating the charge pump, besides the amplifier application illustrated in FIG. 11. The circuit may be used to power output stages of all manner of apparatus, including communications apparatus, where the output stage may drive an antenna or transmission line, an electro-optical transducer (light emitting device) or an electromechanical transducer.

What is claimed is:

1. A charge pump circuit comprising:
   an input terminal for receiving an input voltage;
   first and second output terminals;
   at most first and second flying capacitor terminals; and
   a switch network for interconnecting said input terminal, said first and second flying capacitor terminals and said first and second output terminals to generate a positive output voltage and a negative output voltage that are each substantially equal in magnitude to half the magnitude of said input voltage.

2. The circuit of claim 1, further comprising a common terminal, wherein said switch network interconnects one of said first or second flying capacitor terminals to said common terminal.

3. The circuit of claim 2, wherein said switch network is operable in a plurality of states for interconnecting said input terminal, said first and second flying capacitor terminals, said common terminal and said first and second output terminals.

4. The circuit of claim 3, further comprising a controller for operating said switch network in a sequence comprising one or more of said plurality of states.

5. The circuit of claim 4, wherein said sequence comprises one or more of said plurality of states occurring at different intervals.

6. The circuit of claim 4, wherein said controller is adapted to vary said sequence according to a load condition.

7. The circuit of claim 6, wherein said variation in said sequence includes lowering the frequency of inclusion of one of said plurality of states should said load be asymmetrical.

8. The circuit of claim 1, further comprising a comparator for comparing at least one of said positive or negative output voltages with a reference voltage.

9. An apparatus comprising:
   a flying capacitor;
   first and second reservoir capacitors; and
   a charge pump circuit as recited in claim 2 to provide said positive and negative output voltages for said audio apparatus, wherein said flying capacitor is coupled to said first and second flying capacitor terminals, said first reservoir capacitor is coupled to said first output terminal and said common terminal and said second reservoir capacitor is coupled to said second output terminal and said common terminal.

10. The apparatus of claim 9, wherein the apparatus is an audio apparatus.

11. The apparatus of claim 10, wherein the audio apparatus is a MP3 player.

12. The apparatus of claim 9, wherein the apparatus is a mobile phone.

13. A charge pump circuit comprising:
   an input terminal;
   first and second output terminals;
   a common terminal;
   at most first and second flying capacitor terminals; and
   a switch network, said switch network comprising;
      a first switch for coupling the input terminal to the first flying capacitor terminal,
      a second switch for coupling the first flying capacitor terminal to the first output terminal,
      a third switch for coupling the first flying capacitor terminal to said common terminal,
      a fourth switch for coupling the second flying capacitor terminal to said first output terminal,
      a fifth switch for coupling the second flying capacitor terminal to said common terminal, and
      a sixth switch for coupling the second flying capacitor terminal to the second output terminal.

14. The circuit of claim 13, further comprising a controller for operating said switch network in a sequence of states.

15. The circuit of claim 14, wherein said controller operates said switch network in said sequence of states to generate a positive output voltage and a negative output voltage that are each substantially equal in magnitude to half the magnitude of an input voltage on said input terminal.

16. A method of generating a split-rail voltage comprising: interconnecting first and second output voltage terminals with an input voltage terminal and at most first and second flying capacitor terminals to generate a positive output voltage and a negative output voltage that are each substantially equal in magnitude to half the magnitude of an input voltage.

17. The method of claim 16, furthering comprising interconnecting at least one of said first or second flying capacitor terminals to a common terminal.

18. The method of claim 17, wherein said first and second output terminals, said input terminal, said first and second flying capacitor terminals, and said common terminal are interconnected in a plurality of states.

19. The method of claim 18, wherein one of the plurality of states is obtained by connecting said input terminal to said first flying capacitor terminal and connecting said first output terminal to said second flying capacitor terminal.

20. The method of claim 18, wherein one of the plurality of states is obtained by connecting said common terminal to said first flying capacitor terminal and connecting said second output terminal to said second flying capacitor terminal.

21. The method of claim 18, wherein one of the plurality of states is obtained by connecting said first output terminal to said first flying capacitor terminal and connecting said common terminal to said second flying capacitor terminal.

22. The method of claim 18, wherein one of the plurality of states is obtained by connecting said input terminal to said first flying capacitor terminal and connecting said common terminal to said second flying capacitor terminal.

23. The method of claim 18, wherein one of the plurality of states is obtained by connecting said first output terminal to said first flying capacitor terminal and connecting said second output terminal to said second flying capacitor terminal.

24. The method of claim 18, wherein one or more of said plurality of states are sequenced to generate said positive and negative output voltages.

25. The method of claim 24, wherein said sequence comprises at least two of said plurality of states.

26. The method of claim 24, wherein said sequence comprises one or more of said plurality of states occurring at different intervals.

27. The method of claim 24, wherein a load condition determines said sequence.

* * * * *